UNITED STATES PATENT OFFICE.

ALBERT F. STODDART, OF SNEYD PARK, BRISTOL, COUNTY OF BRISTOL, ENGLAND.

MANUFACTURE OF INK.

SPECIFICATION forming part of Letters Patent No. 255,352, dated March 21, 1882.

Application filed July 26, 1881. (No specimens.) Patented in England February 21, 1881.

*To all whom it may concern:*

Be it known that I, ALBERT FRANK STODDART, a subject of the Queen of Great Britain, residing at Sneyd Park, Bristol, England, have invented certain new and useful Improvements in the Manufacture of Ink, (for which I have made application for Letters Patent in England, No. 741, dated 21st February, 1881;) and I do hereby declare that the following is a full, clear, and exact description of the invention, which will enable others skilled in the art to which it appertains to make and use the same.

At the present time a considerable quantity of spent tanning-liquor is produced in tanneries, and when discharged from the tan-pits is a waste product, and considerable difficulty is frequently experienced in disposing of the liquor in such a manner as not to create any nuisance. I have found that such waste liquor may be utilized by employing it in the manufacture of ink, and that the waste liquor can be made to serve not only as the source from which the gallic acid, but also the thickening substances requisite in the manufacture of ink, may be obtained.

In carrying out my invention I proceed as follows: I take a measured quantity of spent "ooze" or tan-liquor from the tan-pits and boil it in a boiling-pan. If the liquor requires to be concentrated, I continue the boiling until the required degree of concentration is obtained. Generally I reduce it to about one-fourth of its original bulk. The boiled liquor I draw off into a large tub, where it is left to subside. The subsidence takes place in about twenty-four hours, but sometimes is not so prolonged. The top liquor is now drawn off, and is found to contain gallic acid and thickening substances such that on addition of green copperas, or, if necessary, green copperas and a little gum, a good writing or copying ink will be produced. It is not essential that the boiled tan-liquor should be allowed to subside; but a better ink is obtained by allowing it to subside, as described. The top liquor drawn from the subsided débris is again heated in a vessel to about the boiling-point, and the green copperas is mixed with it. The liquor is kept at about the boiling-point until all the copperas is dissolved, and then, if necessary, gum is added. The amount of copperas required to be added varies according to the quality of ink that is being made, and ranges between, say, from two to five grains of copperas for every fluid ounce of unconcentrated liquor. As a general rule no addition of gum is required, but this depends wholly on the composition of the spent tan-liquor employed, which differs when the liquor is obtained from different tanneries or at different times from the same tannery. Other ingredients commonly used in the manufacture of ink may also be added to the liquor. From this last-mentioned vessel the ink is drawn off and placed into tubs, and is allowed to stand exposed to the atmosphere for about three weeks, so that it may get oxidized to the ferric state, and is then ready for use.

Having thus described the nature of my invention and the manner of performing the same, I would have it understood that I claim—

The process described of manufacturing ink, in the preparation of which gallic acid and thickening substances are obtained from spent tanning-liquor, said process consisting in reducing the liquor by boiling, drawing it off, adding green copperas, and boiling until the copperas is dissolved, and then drawing off and exposing to the atmosphere, substantially as set forth.

A. F. STODDART.

Witnesses:
GEORGE FABER PUDEAUX,
   *Solr.,* 14 *John Street, Bristol.*
JOHN EDWIN CHEESE,
   *Of the same place, his Clerk.*